(12) United States Patent
Bellers

(10) Patent No.: US 6,782,054 B2
(45) Date of Patent: Aug. 24, 2004

(54) METHOD AND APPARATUS FOR MOTION VECTOR ESTIMATION

(75) Inventor: Erwin B Bellers, South Salem, NY (US)

(73) Assignee: Koninklijke Philips Electronics, N.V., Eindhoven (NL)

( * ) Notice: Subject to any disclaimer, the term of this patent is extended or adjusted under 35 U.S.C. 154(b) by 485 days.

(21) Appl. No.: 09/839,321

(22) Filed: Apr. 20, 2001

(65) Prior Publication Data

US 2004/0071215 A1 Apr. 15, 2004

(51) Int. Cl.$^7$ .............................................. H04N 11/02
(52) U.S. Cl. ........................... 375/240.27; 375/240.16; 348/402.1
(58) Field of Search ...................... 375/240.16, 240.24, 375/240.27; 348/402.1, 413.1, 416.1

(56) References Cited

U.S. PATENT DOCUMENTS

| | | | | |
|---|---|---|---|---|
| 4,924,310 A | * | 5/1990 | von Brandt | 375/240.16 |
| 5,072,293 A | * | 12/1991 | De Haan et al. | 348/699 |
| 5,148,269 A | | 9/1992 | de Haan et al. | |
| 5,212,548 A | | 5/1993 | de Haan et al. | |
| 5,557,341 A | * | 9/1996 | Weiss et al. | 348/699 |
| 6,385,245 B1 | * | 5/2002 | De Haan et al. | 375/240.16 |
| 2002/0031179 A1 | * | 3/2002 | Rovati et al. | 375/240.16 |

FOREIGN PATENT DOCUMENTS

| | | |
|---|---|---|
| EP | 0 415 491 A1 | 3/1991 |
| EP | 0 474 276 A1 | 3/1992 |

OTHER PUBLICATIONS

Hangu et al: "A cost function with position penalty for motion estimation in MPEG–2 video coding" Multimedia And Expo, 2000. ICME 2000, 2000 IEEE International Conference On New York, NY, USA Jul. 30–Aug. 2, 2000, Piscataway, NJ, USA, IEEE, US, Jul. 30, 2000, pp. 1755–1758.

Hann et al: "True–Motion estimation With 3–D Recursive Search Block Matching" IEEE Transactions On Circuits And Systems For Video Technology, IEEE Inc. vol. 3, No. 5, Oct. 1, 1993, pp. 368–379.

de Haan, G., et al., "True–Motion Estimation with 3–D Recursive Search Block Matching", IEEE Transactions on Circuits and Systems for Video Technology, vol. 3, No. 5, pp. 368–379, (Oct. 1993).

de Haan, G., et al., "Sub–pixel motion estimation with 3–D recursive search block–matching", Signal Processing: Image Communication, vol. 5, pp. 229–239, (1994).

de Haan, G., "Progress in Motion Estimation for Consumer Video Formal Conversion", IEEE Transactions on Consumer Electronics, vol. 46, No. 3, pp. 449–459, (Aug. 2000).

Wittebrood, R.B., et al., "Second Generation DSP Software for Picture Rate Conversion", reprinted from Digest of Technical papers of the International Conference on Consumer Electronics, IEEE (2000).

* cited by examiner

*Primary Examiner*—Chris Kelley
*Assistant Examiner*—George A Bugg
(74) *Attorney, Agent, or Firm*—John F. Vodopia

(57) ABSTRACT

A method to enhance motion estimation is provided. The method includes providing a motion estimator, obtaining at least two candidate motion vectors from the motion estimator and applying an error function having a penalty that depends on the position and size of the candidate motion vectors. A device for recursive motion vector estimation having enhanced convergence is also provided. The device includes a vector generator and a best vector selector. The best vector selector comprises means to evaluate candidate motion vectors by applying an error function having at least a penalty that depends on the position and size of the candidate motion vectors.

18 Claims, 1 Drawing Sheet

METHOD AND APPARATUS FOR MOTION VECTOR ESTIMATION

BACKGROUND OF THE INVENTION

1. Field of the Invention

The present invention relates to methods of motion estimation in a sequence of moving video pictures. More specifically, but not exclusively, the invention relates to methods of motion vector estimation and an apparatus for the same.

2. Description of the Prior Art

A prior art motion estimation technique, called "3-D Recursive Search," has been described by Gerard de Haan and P. W. A. C. Biezen, in "Sub-pixel motion estimation with 3-D recursive search block-matching," Signal Processing: Image Communication 6, pp. 229–239 (1994), incorporated herein by reference as if set forth in full.

3-D Recursive Search falls in the class of block-recursive motion estimators. The algorithm is based on the assumptions that motion does not change much in time, i.e., from field to field. The algorithm maintains a vector field which is updated on field basis. The vector field is usually similar for a relatively large region, i.e., for an object. Therefore the motion vectors in the neighborhood of a location are good candidates for the motion at that location.

A motion video consists of a sequence of fields. Each field is divided into blocks, e.g., of 16 by 16 pixels. A motion vector is associated with each block. The motion vector should hold the displacement between the block in the current frame compared to a previous field or next field. For example, to update the motion vector of block (x, y) in a current field, a 3-D Recursive Search uses only a limited number of candidate vectors, say five, for the estimation, namely, some vectors from the previous field, i.e., temporal vectors, some vectors from the current field, i.e., spatial vectors, and an update of a spatial vector. For each candidate the motion estimation error is calculated. The candidate with the lowest motion estimation error is chosen as the best motion vector for that block. The algorithm uses the normal raster scan order to go through the blocks.

3-D recursive search estimators are also described by G. de Haan, et al. in "True Motion Estimation with 3-D Recursive search block matching," IEEE Trans. Circuits and Systems for Video Technology, Vol. 3, October 1993, pp. 368–379; incorporated herein by reference as set forth in full and in the previously cited "Sub-pixel motion estimation . . . " article.

Motion estimation is useful in several applications. It is part of predictive coding applications like MPEG-2, H.263, and the like. In these applications, motion vectors are used to maximize temporal correlation, thereby minimizing coding error. Motion estimation is also used in the field of video enhancement, for example, to improve the motion portrayal of motion pictures, deinterlacing, or temporal noise reduction.

Motion can be estimated in several ways. For example, motion estimators include a full-search estimator, block-matching, object-based methods, and the like. Nevertheless, they all try to maximize temporal correlation by assuming a certain spatial-invariant motion model. As an example, the 3-D-Recursive Search motion estimator, used in the Philips Natural Motion TV sets, estimates translational motion on a block basis.

In the 3-D Recursive Search Estimator, the candidate motion vectors are selected on a per block basis. An error function, e.g., a mean squared error or mean absolute difference, is calculated per candidate. A penalty is added which depends on the candidate type, e.g., spatial or temporal. The penalty per candidate type is spatially invariant, i.e., it does not vary with the spatial position of the block. As a result, the use of this type of penalty only may result in suboptimal coding gain and some artifacts in the picture.

It is, therefore, an object of the present invention to provide an improved motion estimation method. It is another object of the invention to increase the speed of convergence of motion vectors to improve the convergence process.

SUMMARY OF THE INVENTION

The present invention, which addresses the needs of the prior art, provides an improved motion vector estimation method and a device for the same. As shown in FIG. 1, in a preferred embodiment of the invention, a motion estimator generates at least two candidate motion vectors (110) and an error function having a penalty that depends on the position and size of the candidate motion vectors is applied in order to select a best motion vector (120). Each candidate motion vector is associated with a region representation of a video image.

As shown in FIG. 2, the present invention is also a device 200 for recursive motion vector estimation having enhanced convergence including a random vector generator 210 for generating a plurality of candidate motion vectors associated with selected regions in at least a first and second video image, a best vector selector 220 for comparing the candidate motion vectors of selected regions in a first and a second video image, the best vector selector including means 222 for evaluating the candidate motion vectors by applying an error function having at least a penalty that depends on the position and size of the candidate motion vectors.

Other improvements which the present invention provides over the prior art will be identified as a result of the following description which sets forth the preferred embodiments of the present invention. The description is not in any way intended to limit the scope of the present invention, but rather only to provide the working example of the present preferred embodiments. The scope of the present invention is only limited as indicated in the appended claims.

DETAILED DESCRIPTION OF THE INVENTION

Figure 1:
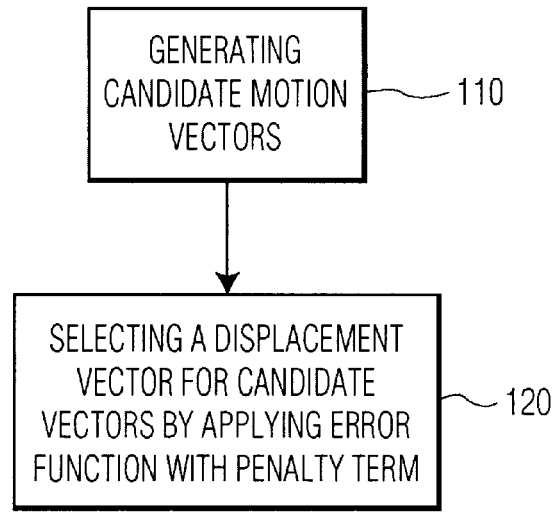
FIG. 1 is a flowchart of a method which uses an error function according to the present invention.
Figure 2:
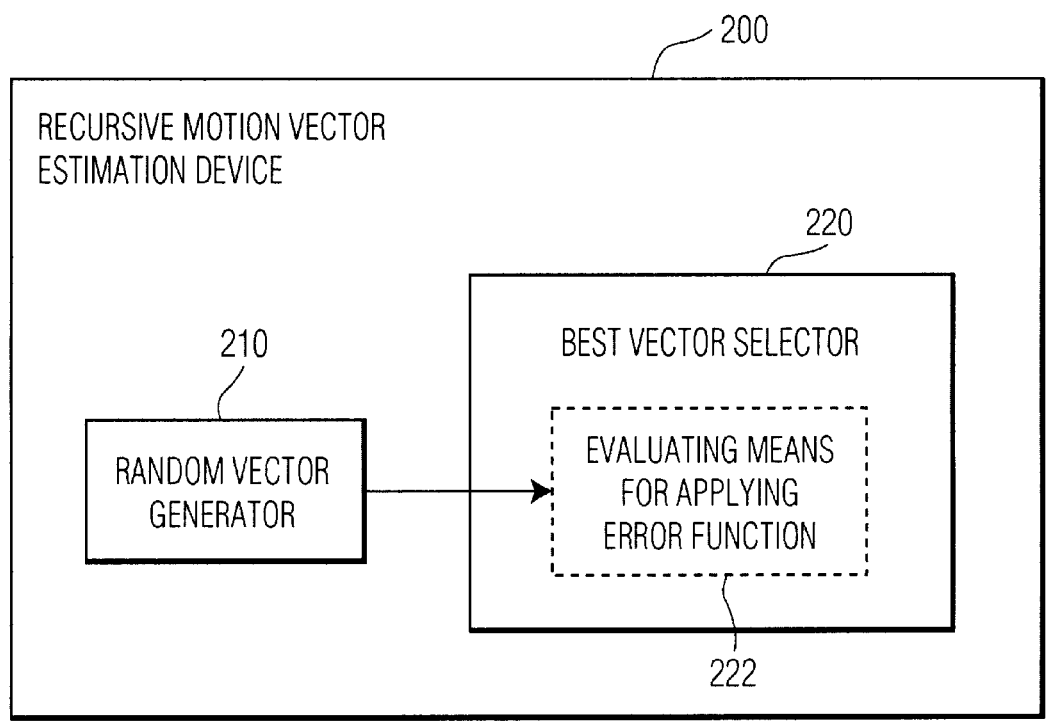
FIG. 2 is a block diagram of the modules in a recursive motion vector estimation device according to the present invention.

The method according to the invention, which is described below, includes providing a motion estimator which can select at least two candidate-motion vectors and applying to the selected candidate motion vectors an error function containing a spatial penalty that depends both on the position and size of the selected candidate.

A motion estimation device includes means to compare picture blocks of one picture with multiple picture blocks in another picture. The evaluation is for a block matching algorithm on the basis of regions or blocks, typically but not limited to 8 by 8 pixels or 16 by 16. Several blocks of another picture are compared with a block in the current picture for which a motion vector is being searched by comparing the pixel value contained in these blocks. The evaluation is accomplished by using an error function, for example a sum-of-absolute differences (SAD), or a mean-squared-error (MSE). In the SAD method all or some of the pixel values within the corresponding blocks are subtracted from each other and evaluated in the error function. Usually, the vector yielding the smallest error is selected as the best match providing the best vector. The corresponding candidate motion vector is selected as the motion vector for the current block. The process starts again for the next block, until all blocks with the current picture are determined.

"A best vector selector", as used herein, refers to a device or method that selects the nearest matching candidate vector.

Useful motion estimators for the present invention include, without limitation, block matching and recursive-pel types as more particularly described by G. de Haan in "Progress in Motion Estimation for Consumer Video Format Conversation", IEEE Transactions on Consumer Electronics, vol. 46, no. 3, pp. 449–459, (August 2000) incorporated herein by reference as if set forth in full. A preferred block matching estimator useful in the invention is the 3-Dimensional Recursive Search Block Estimator, as described in U.S. Pat. Nos. 5,212,548; 5,072,293; 5,148,269, all to de Haan et al., incorporated herein by reference as set forth in full. In addition, useful motion estimators for the present invention, include a motion estimation device as described above which can operate not only on blocks but regions of any kind of shape including blocks and pixels.

In selecting the candidate motion vectors, a video picture, $F(\vec{x},n)$ was considered, where $$\vec{x} = \begin{pmatrix} x \\ y \end{pmatrix}$$

defined the spatial position and n the field number, i.e., the temporal position, and F( ) was the pixel value at the spatio-temporal position defined by $\vec{x}$ and n. The motion, $\vec{d}(\vec{x},n)$, for every pixel in the picture was estimated. However, since the motion estimation process was computation intensive and improvement in consistency with existing motion estimators was sought, the estimation process was limited to blocks of pixels, typically 8 by 8 pixels. As such, the motion, $\vec{d}(\vec{x},n)$ was estimated for every 8 by 8 block in the picture wherein $\vec{X}$ represents the center of a block.

Again, in order to reduce computational complexity and improve spatio-temporal consistency, only a few, typical four to five, candidate motion vectors ($\vec{C}$) per block were evaluated as described in by G. de Haan and P. W. A. C. Bizen in "Sub-pixel motion estimation with 3-D recursive search block matching," Signal Processing: Image Communication, vol. 6, pp. 229–239 (1994). As used herein "spatio-temporal consistency" refers to a consistency in both space and time. The evaluation was based on calculating an error function, typically a sum of absolute differences, though not limited to this:

$$\epsilon(\vec{C},\vec{X},n)=\Sigma_{\vec{x}\in B(\vec{X},n)}|F(\vec{x},n)-F(\vec{x}-\vec{C}(\vec{x},n),n-1)| \qquad (1)$$

where $B(\vec{X}, n)$ is the block of pixels with the center $\vec{X}$.

The candidates were selected from a spatio-temporal neighborhood as more particularly described by G. de Haan and P. W. A. C. Bizen in "Sub-pixel motion estimation with 3-D recursive search block matching," Signal Processing: Image Communication, vol. 6, pp. 229–239 (1994). The best match, i.e., the candidate yielding the smallest cost or error, is selected as the motion vector $d(\vec{X},n)$ for the evaluated block.

To further improve the consistency, a penalty, P, was added which depends on the 'type' of the candidate motion vector. As such, spatial candidates, i.e., candidate motion vectors that are already calculated in the current picture, could be given a different penalty then temporal candidates, i.e., candidate motion vectors that are known from the calculation in the previous picture(s):

$$\epsilon(\vec{C},\vec{X},n)=\Sigma_{\vec{x}\in B(\vec{X},n)}|F(\vec{x},n)-F(\vec{x}-\vec{C}(\vec{x},n),n-1)|+P(\vec{C}) \qquad (2)$$

It has been found that the statistics of motion vectors associated with a video region reveal that the probability of velocities in the picture depend on the position of the screen. It is, therefore, useful to extend the model described above for motion estimation. By adding an additional penalty that depends on the spatial position and size, the motion estimator can be biased towards the found statistics:

$$\epsilon(\vec{C}, \vec{X}, n) = \sum_{x \in B(\vec{X},n)} |F(\vec{x}, n) - F(\vec{x} - \vec{C}(\vec{x}, n), n-1| + P(\vec{C}) + P(\|\vec{C}\|, \vec{X}) \qquad (3)$$

where $\|\vec{C}\|$ is the norm (ie., the 'size') of the candidate motion vector.

As an example, the penalty can be relatively large for large candidate motion vectors in picture blocks $\vec{X}$ towards the outside of the picture, and also for small candidate motion vectors in picture blocks evaluated for the center part of the picture.

The term $P(\|\vec{C}\|,\vec{X})$ is not limited to be used by the 3D-recursive search motion estimator only. Any motion estimator needs to evaluate candidates, which can even be a very large set, according to a certain cost function. The addition of the candidate size and position dependent term in the cost function allow biasing the motion estimator, and is therefore, the preferred embodiment of the present invention.

This relative simple addition to the cost function allows a faster convergence of the motion vector towards the 'real' one. In this manner a dependency was found that helped to improve the convergence. It is noted that based on evaluating only a few candidates, it might take several iterations or passes, most often in the temporal direction, before the real motion vector is found, and convergence is established. Moreover, a faster convergence directly implies an improved overall average accuracy of the motion vectors.

Thus, while we have described what are the preferred embodiments of the present invention, further changes and modifications can be made by those skilled in the art without departing from the true spirit of the invention, and it is intended to include all such changes and modifications as come within the scope of the claims set forth below.

What is claimed is:

1. A method to enhance motion estimation, said method comprising the step of:
   selecting a displacement vector as a best motion vector for a region in a field from a plurality of at least two candidate motion vectors by applying an error function to each of said plural candidate motion vectors, wherein the candidate motion vector with the least error is selected as the displacement vector for the region in the field;

wherein said error function comprises a first penalty term that depends on said candidate motion vector either as calculated in a current frame or as calculated in a previous frame and a second penalty term that depends on the position and size of said candidate motion vector.

2. The method of claim 1, wherein said field is a video image.

3. A device for recursive motion vector estimation having enhanced convergence which comprises:

a vector generator for generating a plurality of candidate motion vectors associated with selected regions in at least a first and a second video image; and a best vector selector for comparing said plural candidate motion vectors of selected regions in a first and a second video image, said best vector selector comprising:

means for evaluating said candidate motion vectors by applying an error function to each of said plural candidate motion vectors, wherein said error function comprises a first penalty term that depends on said candidate motion vector either as calculated in a current frame or as calculated in a previous frame and a second penalty term that depends on the position and size of said candidate motion vector.

4. The method of claim 1, wherein the error function further comprises the sum-of-the-absolute differences or the mean-squared error.

5. The method of claim 1, wherein the method is a 3-D recursive search.

6. The method of claim 1, wherein the region comprises a block of pixels.

7. The method of claim 2, wherein the region comprises a block of pixels.

8. The method of claim 7, wherein the error function comprises the following equation:

$$\epsilon(\vec{C},\vec{X},n)=\Sigma_{\vec{x}\in B(\vec{x},n)}|F(\vec{x},n)-F(\vec{x}-\vec{C}(\vec{x},n), n-1)|+P(\vec{C})+P(\|\vec{C}\|,\vec{X})$$

wherein $\vec{C}$ comprises the candidate motion vector;

wherein $B(\vec{x},n)$ comprises said block of pixels comprising said region in said field;

wherein $\vec{X}$ comprises the center of $B(\vec{x},n)$;

wherein $\vec{x}$ defines a spatial position and n defines a temporal position;

wherein $F(\vec{x},n)$ comprises the pixel value at the spatio-temporal position defined by $\vec{x}$ and n;

wherein $P(\vec{C})$ comprises said first penalty term;

wherein $P(\|\vec{C}\|,\vec{X})$ comprises said second penalty term; and wherein $\|\vec{C}\|$ comprises the size of candidate motion vector $\vec{C}$.

9. The device of claim 3, wherein the error function further comprises the sum-of-the-absolute differences or the mean-squared error.

10. The device of claim 3, further comprising: means for a 3-D recursive search.

11. The device of claim 3, wherein the selected region comprises a block of pixels.

12. The device of claim 11, wherein the error function comprises the following equation:

$$\epsilon(\vec{C},\vec{X},n)=\Sigma_{\vec{x}\in B(\vec{x},n)}|F(\vec{x},n)-F(\vec{x}-\vec{C}(\vec{x},n), n-1)|+P(\vec{C})+P(\|\vec{C}\|,\vec{X})$$

wherein $\vec{C}$ comprises the candidate motion vector;

wherein $B(\vec{x},n)$ comprises said block of pixels comprising said selected region;

wherein $\vec{X}$ comprises the center of $B(\vec{x},n)$;

wherein $\vec{x}$ defines a spatial position and n defines a temporal position;

wherein $F(\vec{x},n)$ comprises the pixel value at the spatio-temporal position defined by $\vec{x}$ and n;

wherein $P(\vec{C})$ comprises said first penalty term;

wherein $P(\|\vec{C}\|,\vec{X})$ comprises said second penalty term; and wherein $\|\vec{C}\|$ comprises the size of candidate motion vector $\vec{C}$.

13. A method to enhance motion estimation, said method comprising the step of:

selecting a displacement vector as a best motion vector for a region in a field from a plurality of at least two candidate motion vectors by applying an error function to each of said plural candidate motion vectors, wherein the candidate motion vector with the least error is selected as the displacement vector for the region in the field;

wherein said error function comprises a first penalty term that depends on a type of said candidate motion vector and a second penalty term that depends on the position and size of said candidate motion vector.

14. The method of claim 13, wherein said first penalty term results in spatial candidates being given a different penalty than temporal candidates.

15. The method of claim 14, wherein said spatial candidates comprise candidate motion vectors that are calculated in a current frame and temporal candidates comprise candidate motion vectors that are known from calculation in a previous frame.

16. The method of claim 13, wherein said field is a video image.

17. The method of claim 13, wherein the region comprises a block of pixels.

18. The method of claim 17, wherein the error function comprises the following equation:

$$\epsilon(\vec{C},\vec{X},n)=\sum_{\vec{x}\in B(\vec{x},n)}|F(\vec{x},n)-F(\vec{x}-\vec{C}(\vec{x},n),n-1)|+P(\vec{C})+P(\|\vec{C}\|,\vec{X})$$

wherein $\vec{C}$ comprises the candidate motion vector;

wherein $B(\vec{x},n)$ comprises said block of pixels comprising said region in said field;

wherein $\vec{X}$ comprises the center of $B(\vec{x},n)$;

wherein $\vec{x}$ defines a spatial position and n defines a temporal position;

wherein $F(\vec{x},n)$ comprises the pixel value at the spatio-temporal position defined by $\vec{x}$ and n;

wherein $P(\vec{C})$ comprises said first penalty term;

wherein $P(\|\vec{C},\vec{X})$ comprises said second penalty term; and wherein $\|\vec{C}\|$ comprises the size of candidate motion vector $\vec{C}$.

\* \* \* \* \*